United States Patent
Bianchi et al.

(10) Patent No.: US 10,139,018 B2
(45) Date of Patent: Nov. 27, 2018

(54) PRE-DUCT DEVICES AND METHODS FOR MAKING AIR DUCTS

(71) Applicant: Unique Fabricating, Inc., Auburn Hills, MI (US)

(72) Inventors: Daniel Bianchi, Auburn Hills, MI (US); Bradley J. Hazen, Rochester, MI (US)

(73) Assignee: UNIQUE FARBICATING INC, Auburn Hills, MI (US)

( * ) Notice: Subject to any disclaimer, the term of this patent is extended or adjusted under 35 U.S.C. 154(b) by 18 days.

(21) Appl. No.: 15/071,763

(22) Filed: Mar. 16, 2016

(65) Prior Publication Data

US 2017/0268702 A1 Sep. 21, 2017

(51) Int. Cl.
*F16L 3/26* (2006.01)

(52) U.S. Cl.
CPC ................................ *F16L 3/26* (2013.01)

(58) Field of Classification Search
CPC ......................................................... F16L 3/26
USPC ............... 138/158, 157, 156, 177, 120, 128, 138/DIG. 8, 110
See application file for complete search history.

(56) References Cited

U.S. PATENT DOCUMENTS

| 4,891,471 | A  | * | 1/1990  | Ono ...................... H02G 3/0418 138/166 |
| 6,273,145 | B1 | * | 8/2001  | Botting .................... F16L 43/00 138/156 |
| 6,872,888 | B2 | * | 3/2005  | Santelli, Jr. .......... H02G 3/0468 138/118 |
| 7,581,564 | B2 | * | 9/2009  | Tanaka .................... F16L 21/06 138/110 |
| 9,193,100 | B2 | * | 11/2015 | Onodera ............. B29C 49/0005 |
| 2003/0051762 | A1 | * | 3/2003 | Kessler ................. F16L 3/1226 138/120 |
| 2012/0138185 | A1 | * | 6/2012 | Tubach ................... B21C 37/15 138/177 |

\* cited by examiner

*Primary Examiner* — Eric Keasel
*Assistant Examiner* — David Deal
(74) *Attorney, Agent, or Firm* — Panagos Law Group PLLC; Bill C. Panagus; Daniel Checkowsky

(57) ABSTRACT

A foam duct is provided. Among other applications, it may be used in automotive HVAC systems. The method of making this duct reduces material waste and provides an unexpectedly reliable joint in a duct at a sharp or rounded corner. In place, the airflow further supports the joint. In the method, a first portion of a hollow pre-duct is joined with a second portion of a hollow pre-duct by bending the portions at a cut-out positioned between the portions. The bending is complete when the portions form a mechanical connection, which may be signaled by tactile or audible feedback.

19 Claims, 5 Drawing Sheets

PRE-DUCT DEVICES AND METHODS FOR MAKING AIR DUCTS

TECHNICAL FIELD

This disclosure relates to ducts and methods of making ducts. Improved lightweight air ducts can be used in many applications, including in harsh environments such as but not limited to automotive HVAC ducts.

BACKGROUND

Conventionally, foam air ducts can be formed using sheets, such as in a twin-sheet forming method. When ducts with complex shapes are formed, including those with sharp or rounded corners, conventional formation of these ducts may cause a substantial amount of material to be wasted. This is because, conventionally, half of the complex shape comes in its final shape from the top sheet, and the other half comes in its final shape from the bottom sheet. Conventionally, each half is integrally and contiguously formed.

SUMMARY

Surprisingly, it has been found that half pre-duct shapes need not be integral and contiguous to be sufficiently durable to survive in difficult environments like automotive HVAC systems. This makes it possible to make more ducts with shapes including corners from a single set of foam sheets. Including a cut-out where a corner would be to act as a hinge can straighten the overall shapes out during thermoforming, making the initial shapes more like "I" shape than an "L" shape. Simply stated, waste can be minimized when making generally "I" shapes from a foam sheet rather than generally "L" shapes. More can be fitted onto a single sheet. The reduction in waste, which in some examples may be a reduction of from about 10-15%, may be especially beneficial where waste is from non-recyclable foams such as cross-linked foams.

After thermoforming, the half pre-duct shapes together, the full pre-duct shapes can be folded or bent at the cut-outs or hinges to make the generally "L" shape with the corner. This minimizes the need for deep draws or stretching during thermoforming. Advantageously, by using cut-outs as hinges in pre-duct devices, wall thickness of a hollow duct can remain substantially uniform. Without the cut-outs, thermoforming may cause stretching in areas such that those regions designed to be corners, thereby thinning walls in those regions of the duct.

Cut-outs can be configured to include mechanical fastening structures. Such structure may provide tactile or auditory feedback to confirm mechanical engagement. Moreover, cut-outs can be reinforced by, for example, laser welding. Moreover, airflow during use can reinforce the joint in-situ.

DETAILED DESCRIPTION

All figures and examples herein are intended to be non-limiting; they are mere exemplary iterations and/or embodiments of the claims appended to the end of this description. Modifications to structure, materials, the order of steps in procedures, temperature ranges, are contemplated.

Figure 1:
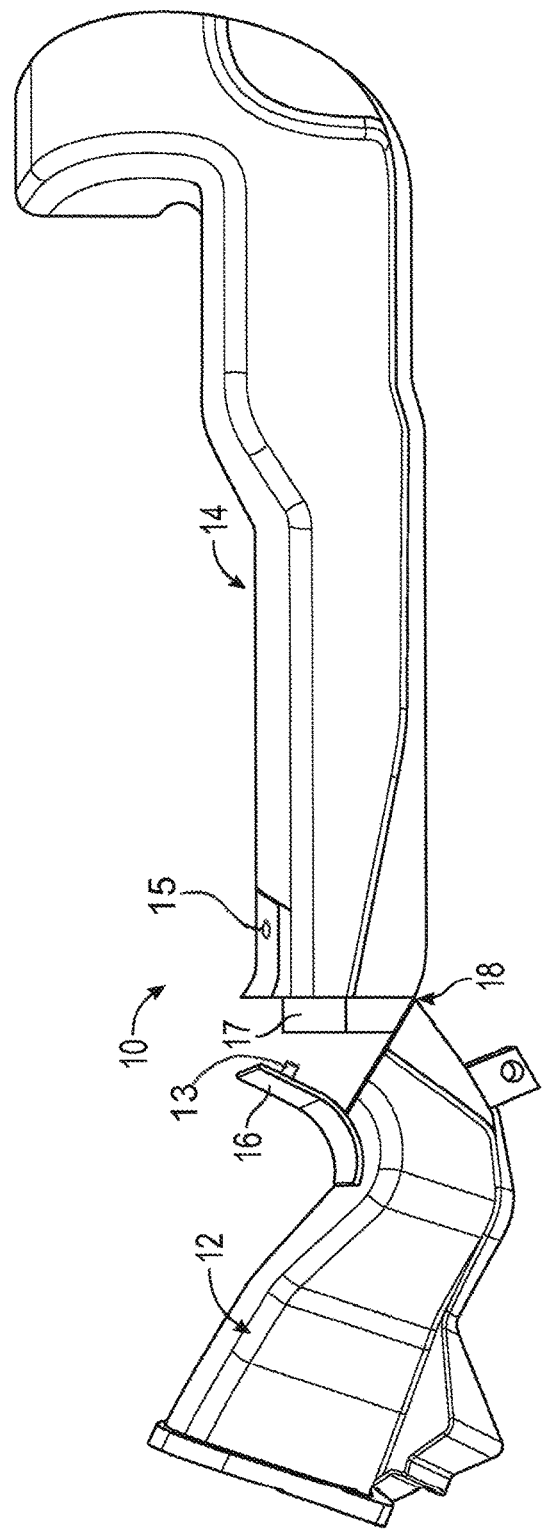
FIG. 1 is an exemplary full pre-duct device.

Referring to FIG. 1 full pre-duct device 10 has been thermoformed into its three-dimensional shape. First portion 12 is separated from second portion 14 by cut-out 18. First portion 12 includes flap 16 which may have a protrusion 13 that can fit into an aperture 15 on second portion 14. Second portion 14 has inner walls 17 that fit inside first portion 12. Other mechanical and/or chemical attachment configurations and mechanisms are contemplated.

Figure 2:
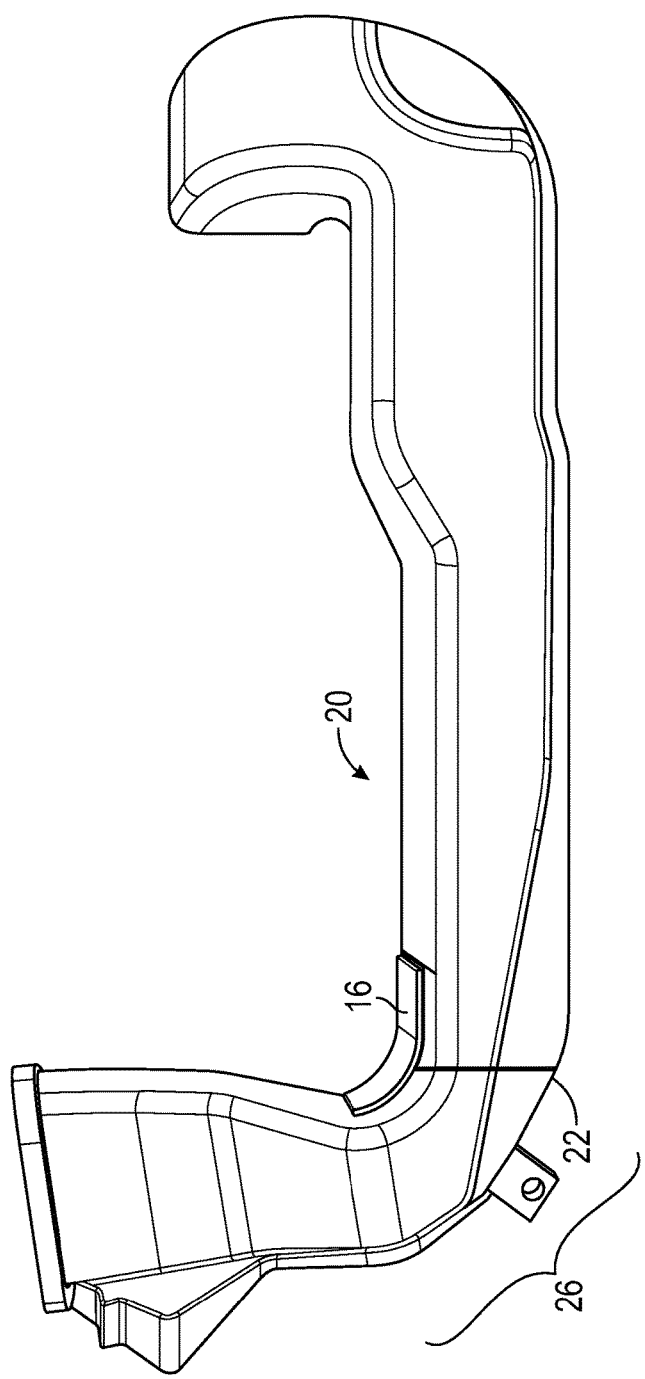
FIG. 2 is an exemplary air duct formed by folding and joining portions of the full pre-duct device of FIG. 1.

Referring to FIG. 2, air duct 20 is formed by folding the device 10 such that first portion 12 is moved toward second portion 14 until a mechanical connection is made between the portions. Corner 26 is formed at joint 22. Note that the term corner as used herein does not require sharp edges or 90 degree angles. Corner is simply a useful term to describe a complex shape that has a significant bend in its overall shape.

Figure 3:
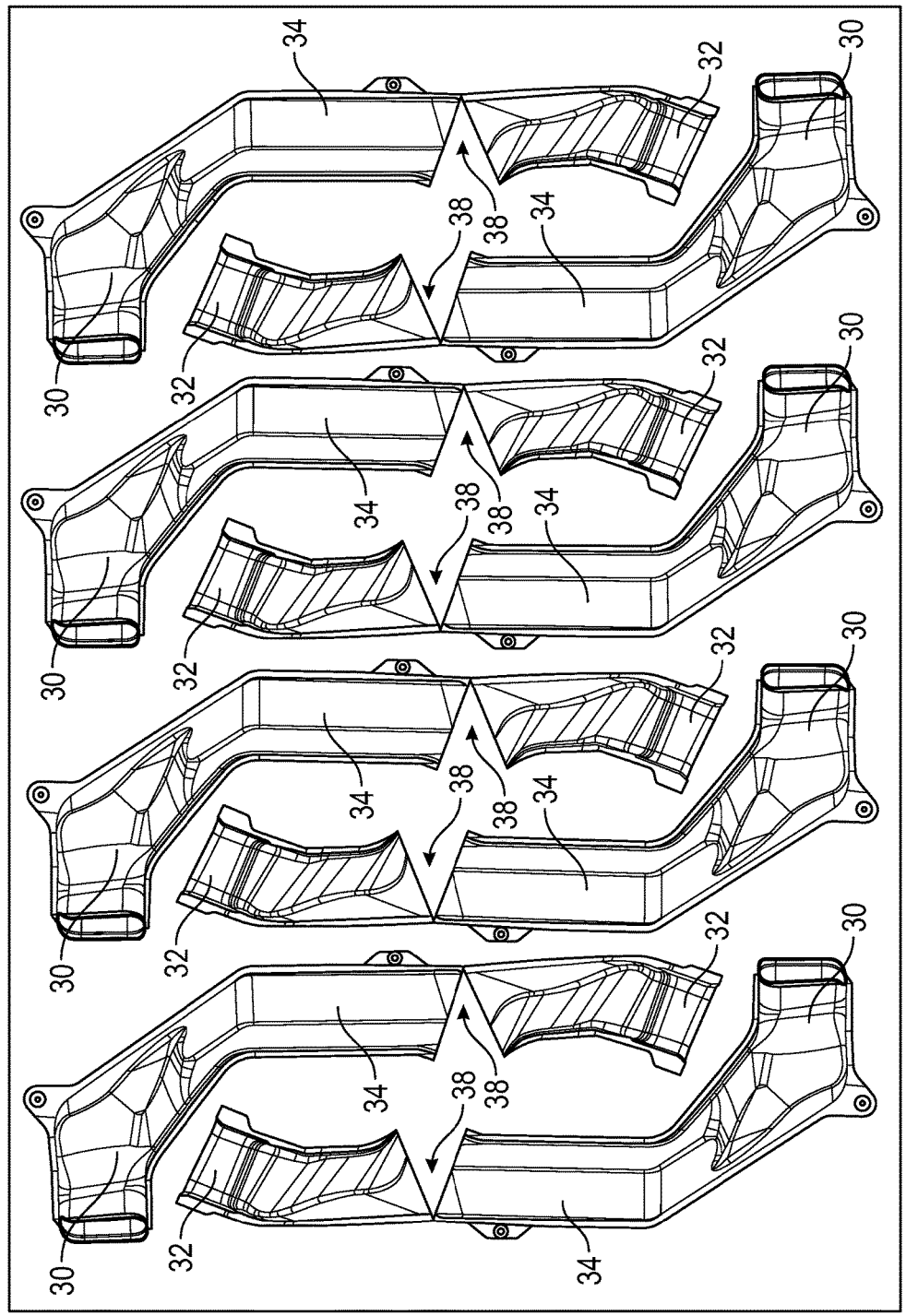
FIG. 3 is a lay-out of half pre-duct shapes with cut-outs on a foam sheet.

Referring to FIG. 3, a lay-out of half pre-duct shapes 30 with cut-outs on a foam sheet. Note that the term "half" as used herein is not meant to denote precisely 50% of a pre-duct shape as measured by amount of material or surface area or volume. Rather, the term is used as a convenience to denote that, in thermoformed examples formed from two sheets, the portion formed from one sheet is "half" and the portion formed from the other sheet is "half." The halves become fused together during thermoforming, joined by a ridge. Depending on a shape of a particular duct, the amount of material in one "half" may be the same as, less than, or more than the other "half."

In a duct made from half pre-duct shapes 30 as exemplified, about 13% of material savings can be realized if cut-outs 38 are positioned between portions 32 and 34. Material savings through reduction in waste can be greater or less, depending upon the shape of the duct. This may be particularly advantageous when using non-recyclable material such as cross-linked foams. Otherwise, fewer half pre-duct shapes 30 fit on a sheet. That is, the cut-outs 38 permit the thermoforming to take place with shapes that resemble more of "I" than an "L." Even though a joint is being introduced into a duct that had been conventionally been made contiguously, surprisingly, the joint is strong and durable in harsh environments such as automotive HVAC environments.

Cut-outs 38 generally have an origin (that may act as a hinge) and an angle between portions 32 and 34. The angle can vary in degree depending on the shape of the duct to be formed. In some examples, the angle of the cut-out 38 may be as low as 5 degrees or as high as 175 degrees. More typically, cut-outs 38 vary in angle from about 10 degrees to about 60 degrees.

Figure 4:
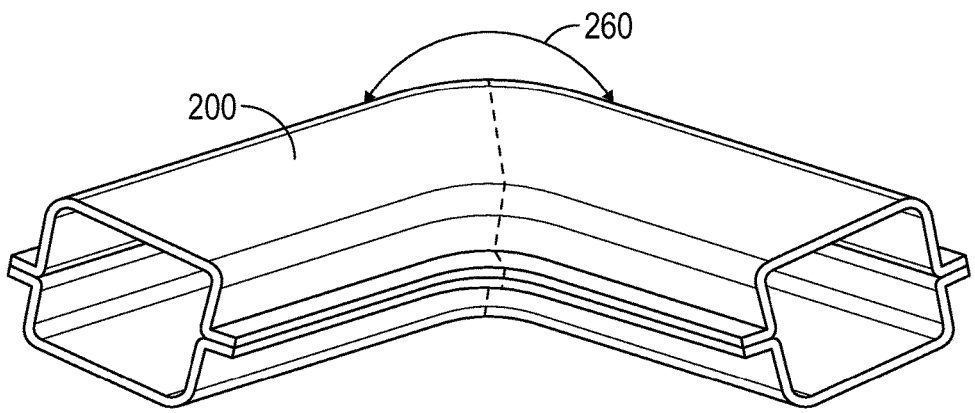
FIG. 4 is an exemplary air duct.

Referring to FIG. 4, exemplary air duct 200 is shown with corner 260. Air duct 200 is formed by folding portions of full pre-duct devices together at corner 260. As is evidenced from the ridge between top and bottom halves of the air duct, the exemplary full pre-duct devices were thermoformed by, for example, twin sheet processing.

Figure 5:
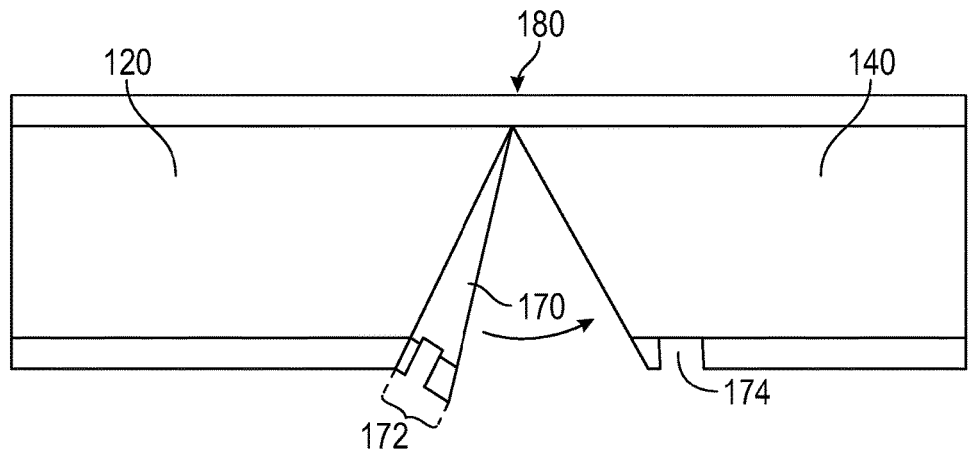
FIG. 5 is a top view of an exemplary half pre-duct shape with a cut out and a flap.

Referring to FIG. 5, a top view of an exemplary half pre-duct shape with a cut out 180 flanked by portions 120 and 140. Portion 120 and 140 at or near cut-out 180 include mechanical structure for joining the portions 120 and 140 to form a joint at a corner and thereby form an air duct. In this non-limiting example, flap 170 has teeth 172 that engage with complementary engagement structure 174. Any number of connection mechanisms may be used, mechanical or chemical. Hook and loop fosters, snaps, or simply protrusions slidable into apertures. It is not important if structure is that one portion or the other, just that the connection mechanism joins the opposing parts.

Figure 6:
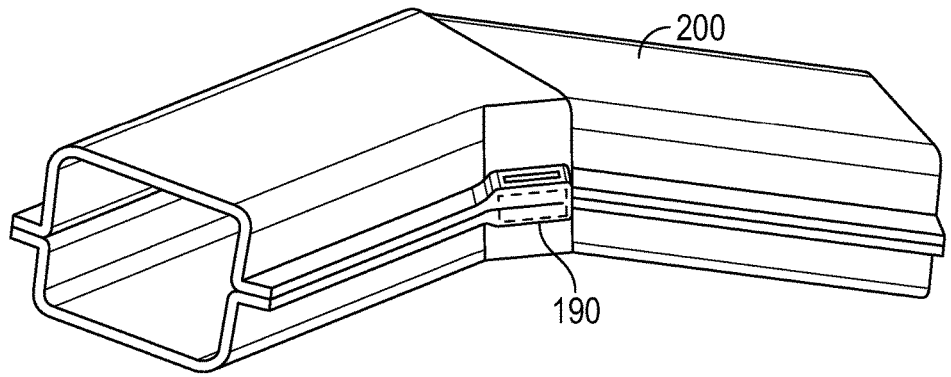
FIG. 6 is a view of a corner of an exemplary air duct with a reinforced joint.

Referring to FIG. 6, exemplary air duct 200 includes a mechanical connection 190 at the joint. The mechanical connection 190 can be the one formed at forming the air duct 200, which could provide auditory or tactile feedback to let a folder know the joint had been formed, or it could be an additional mechanical device providing reinforcement to the joint created during formation of the air duct 200. That is, in one example, a user can feel and/or hear a mechanical joint being formed when bending a first full pre-duct device toward a second full pre-duct device sufficiently far as the engage the protrusion/aperture connection or other connection.

Figure 7:
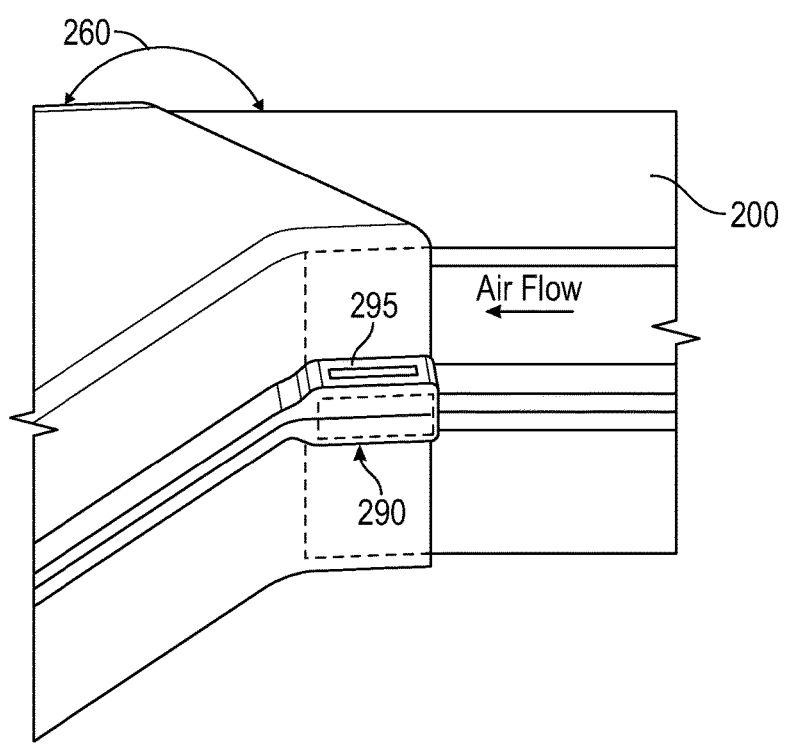
FIG. 7 is a view of a corner of an exemplary air duct with a reinforced joint.

Referring to FIG. 7, exemplary air duct 200 includes corner 260. Exemplary reinforcement mechanisms are provided. One such mechanism is the use of the air duct itself. That is, airflow through the duct moves in a direction that tends to keep the portion inside the complementary portion in place. Other examples are latches positioned at 290, either integrally formed with the foam or added on, or welds such as are indicated at weld line 295.

Exemplary air ducts may comprise any of a number of materials, including plastics such as thermoplastics, thermosetting plastics and foamed materials. Exemplary plastics may include polyethylene and/or polypropylene. Fatigue and flexing properties (ASTM D-430 and D-813) of the folding joint/hinge should be sufficient to maintain the integrity of duct 10 in conditions typical of an HVAC environment. Where the duct comprises plastic, mechanical properties of the materials, it may be sufficient impact strength, tensile modulus, and/or flexural strength (ASTM D-790 and D-747) to permit folding as desired and to withstand conditions typical of an HVAC environment.

As a non-limiting example where the duct comprises foam, the duct may be formed from a closed-cell, cross-linked polyolefin foam material. Exemplary polyolefin foam blends may comprise one or both of polypropylene and polyethylene. The percentage by weight of polypropylene and polyethylene in the polyolefin foam blend may vary as a result of the manufacturing process, but the percentage by weight of polypropylene may be higher than the percentage by weight of polyethylene. Suitable types of foam material are available through Toray Industries, Sekisui Voltek, Armacell, and Qycell Corporation. One non-limiting example may include Toray's Crosslinked Polyolefin Foam. Another non-limiting example may include Trocellen Class chemically cross-linked, closed cell polyethylene foam, available through Trocellen GmbH.

The foam sheets may have the same or different density and/or thickness. One or the other or both may have a density in the range of about 2 lb/ft$^3$ to 4.31 lb/ft$^3$, and more specifically, a density of about 4 lb/ft$^3$. The foam sheets may have a thickness of about 4 mm. Other thicknesses and densities are contemplated, including those higher and lower than the exemplified ranges.

The duct may be formed by any of a number of manufacturing methods. Where the duct is plastic, one or more components may be formed through one or more of any of a number of manufacturing processes including extrusion, casting, and injection molding. In a non-limiting example pertaining to foam ducts, a plurality of ducts are formed by twin sheet processing two sheets of foam material, creating a thermoformed seal.

The foam sheets are properly sized. This may require the foam sheets to be cut or trimmed to a specific length and/or width. The size of the foam sheets may be determined by the size and shape of the foam air ducts that will be formed. Half pre-duct shapes with cut-outs as exemplified in FIG. 3 can maximize the number of air ducts formable from a particular set of foam sheets and minimize material waste. In certain applications, the size of the foam sheets may also be determined by the size of the press and the dimensions of an upper mold tool and a lower mold tool of the twin sheet processing tool.

The foam sheets are engaged with a first frame a second frame. The foam sheets may be engaged with the frames using hydraulically operated mechanical clamps or any other suitable fastening mechanisms for holding the foam sheets in place during a heating operation. By clamping the foam sheets to the frames, the foam sheets may also be kept in tension during heating. The foam sheets may be introduced into a heating operation. The process may occur in an oven or any structure capable of heating the foam sheets to a predetermined temperature for a specific period of time. The temperature and time period to complete the heating process are dependent on the density and the thickness of the foam sheets being used to form the foam air duct. In one example, the foam sheets may be heated to a temperature in the range of about 250° F. to 400° F. When the foam sheets are heated within this temperature range, the sheets may be molded into the shape of the desired hollow foam air duct using the twin sheet forming tool including a press, the upper mold tool, and the lower mold tool.

The upper tool mold and the lower tool mold may include channels or any other suitable structures capable of removing air. Accordingly, a vacuum pump or any other suitable device may be applied to the upper tool mold causing the first foam sheet to take the form of the interior surface of the upper tool mold. This may create a first section of the foam air duct. Similarly, a vacuum pump or any other suitable device may be applied to the lower tool mold causing the second foam sheet to take the form of the interior surface of the lower tool mold. This may create a second section of the foam air duct. The upper tool mold and the lower tool mold may then be compressed together. The effect of the heated sheets and the pressure from the compression bonds the foam sheets together in the desired shape, forming a unified full pre-duct device of a predetermined shape, each device having portions flanking a cut-out.

Cooling of pre-duct devices may be permitted. Excess material may be removed so the full pre-duct devices are close to a final shape. Then, the full pre-duct shapes may be bent at the cut-out to join first and second portions of a full pre-duct shape to make a joint at a corner of a duct and form a foam duct. Flaps from one portion may be inserted into the other portion. The joint may be mechanical and may be reinforced mechanically and or chemically, such as with a fastening or latching device or structure, a laser weld, or an adhesive. The attachment may or may not involve engagement of a flap or protrusion on a flap on one portion with receiving structure on the other portion.

With regard to the processes described herein, it should be understood that, although the steps of such processes, have been described as occurring in a certain sequence, such processes could be practiced with the described steps performed in an order other than the exemplary order. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined with reference to the appended claims along with the full scope of equivalents to which such claims are entitled. It is anticipated and intended that future developments will occur, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed as new and desired to be protected by Letters Patent of the United States is:

1. A method of making a foam duct from a plurality of foam sheets, the method comprising:
    twin sheet vacuum forming the plurality of foam sheets to make a plurality of half pre-duct shapes into a plurality of full pre-duct shapes, each full pre-duct shape having a first portion including a first wall defining an interior passage configured to allow passage of a gas and a connector extending from the first wall, and a second portion including a second wall;
    forming cut-outs between the first portion and a second portion;
    removing excess material to separate the plurality of thermoform full pre-duct shapes;
    bending the full pre-duct shapes at the cut-out to position the second wall within the interior passage of the first portion and engage the connector with an outer surface of the second wall to join the first and second portions of the full pre-duct shape to make a joint and form the foam duct.

2. The method of claim 1 wherein the plurality of foam sheets comprises two closed-cell, cross-linked polyolefin sheets.

3. The method of claim 1 wherein the cut-outs are configured to make a mechanical connection between the first portion and the second portion.

4. The method of claim 3 wherein the cut-outs are configured to provide tactile or auditory feedback to confirm the mechanical connection.

5. The method of claim 1 further comprising reinforcing the joint between the first and second portions.

6. The method of claim 5 wherein reinforcing comprises laser welding.

7. A foam duct made by the method of claim 1.

8. An automotive HVAC duct made by the method of claim 1.

9. The method of claim 1 wherein the connector comprises a flap having a protrusion extending from the flap, the method further comprising folding the flap onto the second portion and engaging the protrusion with an aperture in the second portion.

10. A thermoformed full pre-duct device comprising:
    a first portion of a hollow duct including a first wall defining an interior passage configured to allow passage of a gas and a connector extending from the first wall;
    a second portion of the hollow duct including a second wall; and
    a cut-out between the first and second portions of the device, wherein the pre-duct device is bendable at the cut-out to mechanically join the first portion and the second portion to form the hollow duct, such that the second wall of the second portion is disposed within the interior passage of the first portion and the connector engages an outer surface of the second wall.

11. The pre-duct device of claim 10 wherein the hollow duct comprises foam.

12. The pre-duct device of claim 10 wherein the cut-out comprises mechanical latching structure.

13. The pre-duct device of claim 10 wherein the connector comprises a flap foldable onto the second portion.

14. The pre-duct device of claim 13 wherein the flap is configured to make a mechanical connection with structure in the second portion.

15. The pre-duct device of claim 13 wherein the flap includes a protrusion that engages an aperture in the second portion.

16. The pre-duct device of claim 10 further comprising a reinforcement mechanism to secure the joint.

17. The pre-duct device of claim 10 wherein the second portion includes teeth and the connector includes a complementary engagement structure that engages the teeth when the first portion is mechanically joined to the second portion.

18. The pre-duct of claim 10 wherein the second portion includes an inner wall disposed within the first portion when the first portion is mechanically joined to the second portion.

19. The pre-duct of claim 18 wherein the connector is located opposite an apex of the cutout.

* * * * *